(12) United States Patent
Gu

(10) Patent No.: US 11,080,520 B2
(45) Date of Patent: Aug. 3, 2021

(54) AUTOMATIC MACHINE RECOGNITION OF SIGN LANGUAGE GESTURES

(71) Applicants: Atlassian Pty Ltd, Sydney (AU); Atlassian, Inc., San Francisco, CA (US)

(72) Inventor: Xiaoyuan Gu, Milton, MA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 217 days.

(21) Appl. No.: 16/453,935

(22) Filed: Jun. 26, 2019

(65) Prior Publication Data

US 2020/0005028 A1   Jan. 2, 2020

Related U.S. Application Data

(60) Provisional application No. 62/691,467, filed on Jun. 28, 2018.

(51) Int. Cl.

| | |
|---|---|
| *G10L 13/00* | (2006.01) |
| *G06K 9/00* | (2006.01) |
| *G06N 3/08* | (2006.01) |
| *G06K 9/62* | (2006.01) |
| *G10L 13/047* | (2013.01) |
| *G06K 9/20* | (2006.01) |

(52) U.S. Cl.
CPC ....... *G06K 9/00355* (2013.01); *G06K 9/2054* (2013.01); *G06K 9/628* (2013.01); *G06K 9/6256* (2013.01); *G06N 3/08* (2013.01); *G10L 13/00* (2013.01); *G10L 13/047* (2013.01); *G06K 2209/01* (2013.01)

(58) Field of Classification Search
CPC .. G06K 9/00355; G06K 9/628; G06K 9/6256; G06K 9/2054; G06K 2209/01; G06K 9/00389; G06K 9/6271; G10L 13/00; G10L 13/047; G10L 15/26; G06N 3/08; G06N 3/0481; G06N 20/10; G06N 3/082; G06N 3/0454
USPC ........................................................ 704/259
See application file for complete search history.

(56) References Cited

U.S. PATENT DOCUMENTS 10,521,928 B2 * 12/2019 Chandler ............. H04N 13/239

\* cited by examiner

*Primary Examiner* — Charlotte M Baker
(74) *Attorney, Agent, or Firm* — Brownstein Hyatt Farber Schreck, LLP

(57) ABSTRACT

Computer-implemented techniques are provided for machine recognition of gestures and transformation of recognized gestures to text or speech, for gestures communicate in a sign language such as American Sign Language (ASL). In an embodiment, a computer-implemented method comprises: storing a training dataset comprising a plurality of digital images of sign language gestures and an alphabetical letter assigned to each digital image of the plurality of digital images, training a neural network using the plurality of digital images of sign language gestures as input and the alphabetical letter assigned to each digital image as output, receiving a particular digital image comprising a particular sign language gesture, and using the trained neural network to classify the particular digital image as a particular alphabetical letter.

20 Claims, 4 Drawing Sheets

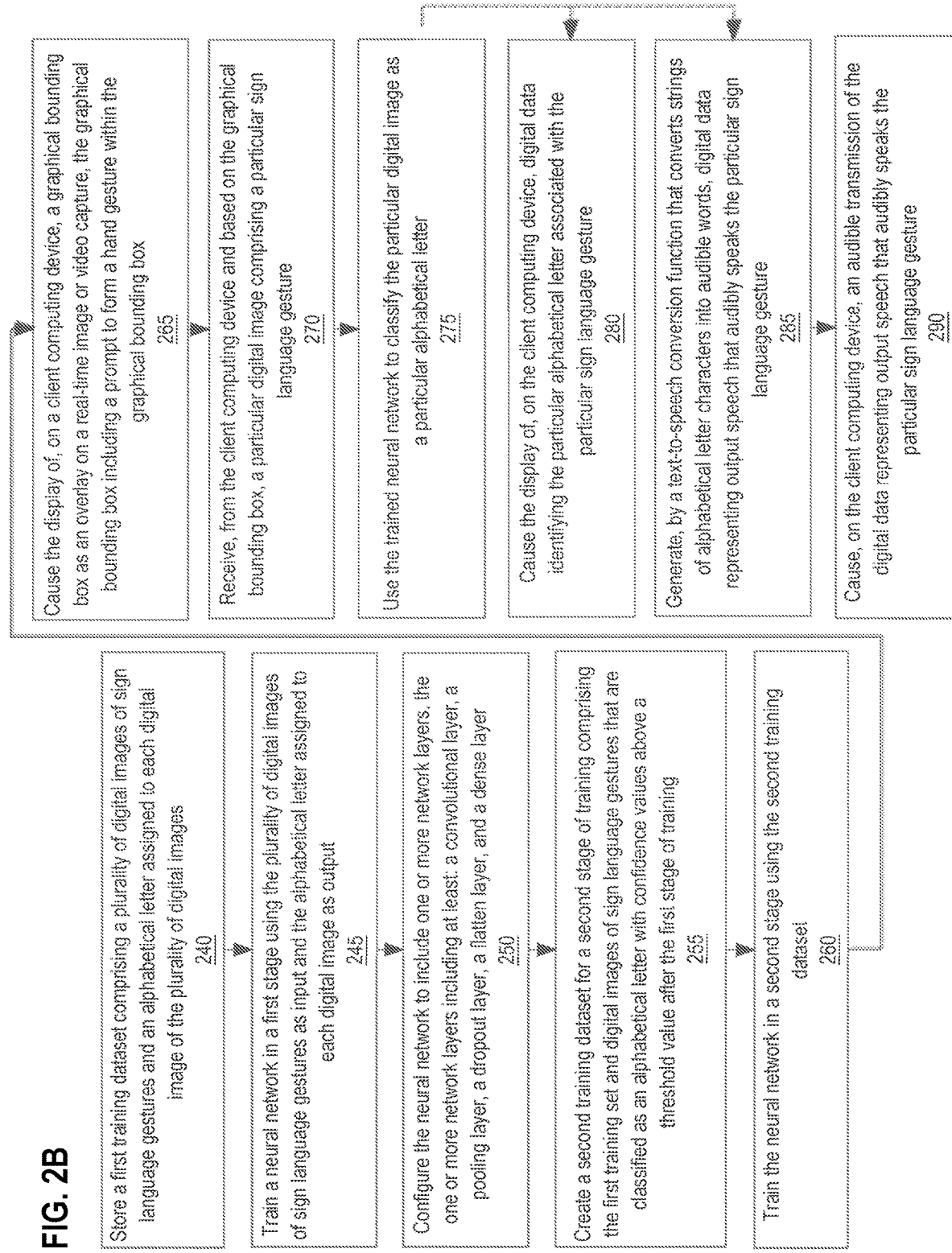

AUTOMATIC MACHINE RECOGNITION OF SIGN LANGUAGE GESTURES

BENEFIT CLAIM

This application claims the benefit under 35 U.S.C. § 119(e) of provisional application 62/691,467, filed Jun. 28, 2018, the entire contents of which are hereby incorporated by reference for all purposes as if fully set forth herein.

FIELD OF THE DISCLOSURE

One technical field of the present disclosure is machine vision. Another technical field is machine recognition of human hand gestures. Another technical field is machine recognition of hand gestures and transformation of recognized gestures to text or speech, based on gestures used to communicate in a sign language such as American Sign Language (ASL).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

According to research, about 18 million people in the United States have speech disorders. Worldwide, about 70 million people have been born deaf, and use sign language as their first language. More broadly, over 5% of the world's population or at least 360 million people suffer from disabling hearing loss, and almost twice as many hearing-impaired people are not in the labor force compared to hearing people. For people born deaf, the chance of obtaining satisfying, productive work in the labor force is only 50% compared to hearing people, which is a sad situation.

Hearing-impaired persons face special challenges in the workplace including communications with others. Contemporary office environments commonly rely at least in part on oral social activities such as videoconferences, telephone conferences and person-to-person audio or video calls, but these experiences may be difficult for some hearing-impaired persons to participate in. As business entities continue to emphasize collaborative, team development of products and services, the challenges of hearing-impaired persons become more profound.

What is needed is a fast, efficient, easy-to-use mechanized means to transform continuous video streams of human sign language gestures into text, audible speech or other digital data that can be stored, manipulated and transmitted via computer.

SUMMARY

The appended claims may serve as a summary of the invention.

BRIEF DESCRIPTION OF THE DRAWINGS

In the drawings:

FIG. 2B illustrates an example programmable algorithm or method for machine recognition of gestures based on digital video images of human hand gestures, in one embodiment.

DETAILED DESCRIPTION

Figure 1:
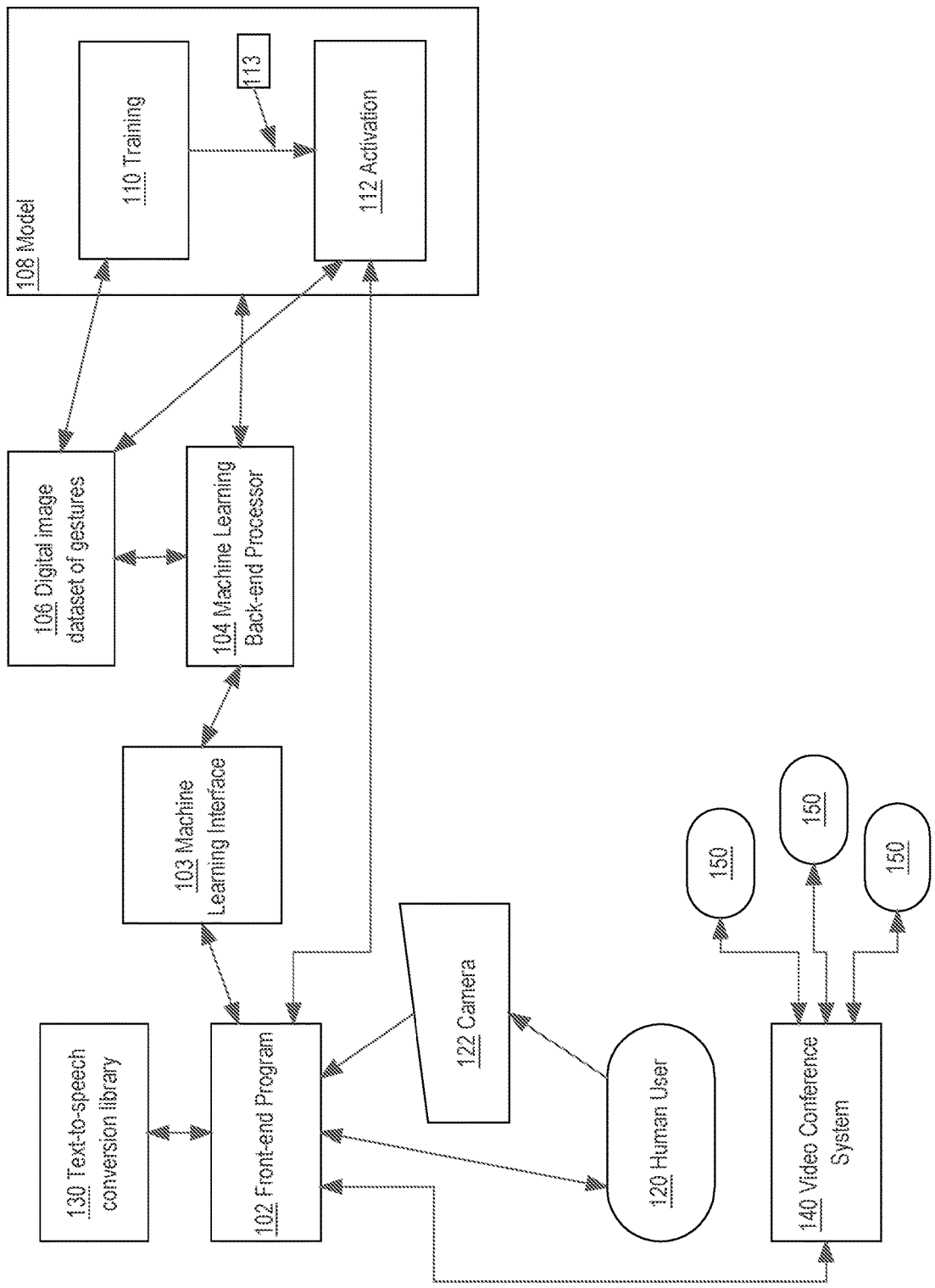
FIG. 1 illustrates functional elements of a data processing system for automatic recognition of sign language and conversion to text or speech, in one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:
1.0 GENERAL OVERVIEW
2.0 EXAMPLE COMPUTER SYSTEM IMPLEMENTATION
3.0 EXAMPLE MACHINE LEARNING MODEL CONFIGURATION
4.0 EXAMPLE FUNCTIONAL OVERVIEW
5.0 EXAMPLE FUNCTIONAL IMPLEMENTATION
6.0 IMPLEMENTATION EXAMPLE—HARDWARE OVERVIEW

1.0 General Overview

In an embodiment, a computer-implemented artificial intelligence application using deep learning is programmed to recognize sign language alphabets based on digital video images of human hand gestures. In one embodiment, computer vision of gestures is accomplished using the OpenCV software system, primarily for capturing images of hand gestures to provide to a machine learning model.

In an embodiment, image recognition with deep learning is executed using KERAS, which forms part of the TENSORFLOW back-end that is commercially available online, with configuration and data parameters that are unique to the present disclosure and have been found to optimize its performance. Convolutional neural networks are configured, primarily to perform multi-class classifications of image data into one of the 24. American Sign Language (ASL) alphabet classes. Embodiments have been found, in practice, to achieve over 95% accuracy with training data and test data. Input to the machine learning model is a digital dataset representing a vectorized digital image, and output from the machine learning model is an ASCII character corresponding to one letter in the ASL alphabet. Output may be characters A through Z, excluding J and Z, as these require two hand motions for a single alphabet.

While certain embodiments are described for use in connection with digital still images, other embodiments may use similar techniques to recognize gestures in a digital video stream, such as in a video chat room application. Furthermore, embodiments may be adapted to generate datasets representing emotional intelligence from video chat. For example, video calls and videoconferences may be programmed to collect such signals as: percentage of time that a participant maintained eye contact; percentage of time that a participant showed attention and engagement; percentage of time that the participant's face conveyed negative emotions; expressions such as bored, curious, disappointed or excited, to generate as output common words associated with the expressions. This data could be formatted in a self-assessment or performance review of a participant in a video call or video conference. Or, the data may be formatted in reports to managers to assist in understanding team interaction issues such as identifying persons who dominate conversations or do not participate.

In one embodiment, computer programs based on machine learning are programmed to recognize sign language hand signals that are performed, in a video conference, within a certain quadrant of the screen by a hearing-impaired user. Some embodiments may be programmed in PYTHON with FLEX. A recognized character may be joined to other characters as words, then translated into text or audio for other video conference participants. Conversely, voice signals are translated into text, then translated into sign language and displayed to the hearing-impaired user using animated graphical images of a hand, or static images of a hand performing a gesture for a particular character. Or, it is possible for output from the program to drive a robot hand that moves to form an output gesture representing a letter. Thus, embodiments provide computer-implemented techniques for recognition of sign language gestures and conversion to text and speech, and the converse translation in the context of enabling two-way sign language chat.

In some embodiments, a video conference software application is programmed to generate a graphical bounding box, using color or other visual highlighting, as an overlay on an image of a human user, the image being captured from a camera as the user is participating in the video conference. That is, when a user participates in a video conference, rather than seeing only a thumbnail image of the user's face or upper body, the application is programmed to display an enlarged image with a bounding box. The application is also programmed to prompt the user to form a hand gesture within the bounding box. In an embodiment, digital image contents of the bounding box are periodically captured and programmatically transmitted to a back-end processing system for recognition.

The back-end processing system incorporates a trained classifier program that receives the image, performs feature recognition, provides digital image features to a classification network and outputs a classification value and a confidence value. The classification value may be one of 24. American Sign Language characters. Other embodiments may be trained to output characters for other sign language alphabets and then used for classification of image features in the same manner.

2.0 Example Computer System Implementation

FIG. 1 illustrates functional elements of a data processing system for automatic recognition of sign language and conversion to text or speech, in one embodiment. In the example of FIG. 1, a front-end program 102 is programmed to call functions of a machine learning interface 103, which is communicatively coupled to a machine learning back-end processor 104.

A training dataset, such as a digital image dataset 106 consisting of a large number of different individual digital images of sign language gestures, is coupled to the machine learning back-end processor 104. In one embodiment, dataset 106 comprises the MNIST sign dataset that is publicly available from KAGGLE on the internet at the page titled "sign-language-mnist" of the folder "datamunge" of the "kaggle" domain in the dot com registry. This data consists of 28×28 pixel images in grayscale of example human hands forming sign gestures. In other embodiments, larger images, and/or images in color, could be used for training. Furthermore, the KAGGLE dataset could be extended or supplemented with separately prepared images of other persons signing the same gestures; any such supplemental images should be normalized to the same range of pixel values and image dimensions. What is important is that the dataset 106 comprises a large number of images with multiple instances of hand images for the same gesture or sign language letter, with variations in hand color, size, and arrangement of fingers that reflect how real users might gesture a particular letter.

Based on the training dataset, the machine learning back-end processor 104 may interoperate with a digitally stored machine learning model 108 as part of a training phase 110. In the training phase, images from the dataset 106 are processed to identify features that are influential on an output classification in terms of uniquely identifying a character that is represented in the gesture. For example, the dataset 106 could include one hundred or more different images of different persons gesturing the letter "A", and the training phase is programmed to extract features from these images that are useful in classifying the gestures as indicating "A" rather than some other letter. The trained model is persisted to become available in an activation phase 112, as indicated by arrow 113.

In one embodiment, the KERAS system and a convolutional neural network architecture are used for back-end processing in association with machine learning back-end processor 104 and machine learning interface 103. KERAS is a high-level neural networks API, written in Python and capable of running on top of TensorFlow, CNTK, or Theano. In an embodiment, machine learning 103 may comprise KERAS with a specified configuration. In an embodiment, machine learning backend processor 104 may comprise TensorFlow. Further information and code is available online at https://keras.io. Convolutional neural networks are explained in an article available online at the article titled "Convolutional_neural_network" of the Wikipedia service.

Training a dataset may comprise using a support vector machine with extreme gradient boost principles. In machine learning, support vector machines (SVMs, also support vector networks) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

Referring again to FIG. 1, once the model 108 is trained via training phase 110, the model may be used in an activation phase 112 to classify input. For example, a human user 120 may have access to a digital camera 122 that is communicatively coupled to the front-end program 102, which is also coupled to a text-to-speech conversion library 130. In use, in one embodiment, the user 120 digitally captures an image of their own hand forming a gesture of a sign language letter, using camera 122. An image from camera 122 is obtained by front-end program 102, which calls an API function of interface 103 to pass the image to processor 104 and activation phase 112 of model 108. The activation phase 112 classifies the digital image based on extracting features and using classification logic to effectively compare the features to trained features of the model 108. Output consists of a letter or character value and a confidence value. For example, the letter value may be "A" and the confidence value could be "96%", or a real number between 0 and 1 such as 0.96, or an integer such as "96", indicating a level of confidence that the gesture was properly classified as "A".

This output is provided back to the front-end program 102 for communication to user 120, or other users, in any of a plurality of different means. For example, front-end program 102 may call functions of text-to-speech conversion library 130, based on strings of characters that have been formed into words, to generate output speech that audibly speaks the gesture. In an embodiment, text-to-speech conversion may be implemented using the GTTS Python package and Amazon Polly API. The output speech may be transmitted to a video conference system 140 for communication via a video switch or bridge to user 120 or to a plurality of other users 150 depending on the mode of operation. For example, if user 120 is hearing-impaired, then the system may operate in a mode in which images of the user's hand are captured and transformed into text and speech that is transmitted to other users 150.

Or, if user 120 is a hearing person, then the system could be used in a converse mode to receive text typed by the user, or speech spoken by the user, which is then transformed into images of gestures that are displayed to other users 150, who could be hearing-impaired. This converse mode of operation does not require the use of the machine learning techniques described above. Instead, speech spoken by a user may be processed using a speech recognition system to yield output text. That text, or text directly typed by a user in a computer application, may be processed character-by-character to select a particular digital image, from among a library of 24 sign images, and output visually to the hearing-impaired user. In some embodiments, this capability may be integrated into a video conference program or video conference bridge and executed in real-time as a speaker speaks in the conference.

In some embodiments, gestures properly classified using the foregoing activation phase 112 and resulting in high confidence values may be fed back to the training dataset for use in a subsequent round of training. This approach has been found to increase the output accuracy of the gesture recognition system by up to 95%.

3.0 Example Machine Learning Model Configuration

To optimize classification accuracy of the gesture recognition system, machine learning models such as convolutional neural networks may be configured using specific settings or parameters. The following embodiments may provide a detailed configuration for KERAS and TENSORFLOW.

In an embodiment, a batch size, also referred to as a sample set size, is set to a value of 32. A number of classes is set to a value of 26 to resemble the number of alphabetic letters in the Roman alphabet. A number of training iterations is set to a value of 20 because after running 20 iterations of training, accuracy results do not normally improve. Training parameters including activation mode and optimizer mode may be set to 'adam' and 'relu', respectively. Parameters may also include the input image dimensions such as the number of rows and columns in an image and labels for output characters from A to Z, in the 24-letter ASL alphabet, are declared.

In an embodiment, an input dataset may be configured or preprocessed for training a machine learning model. For example, MNIST SIGN is a training dataset that is publicly available from KAGGLE that includes grayscale sign images of ASL. Each training case is configured to represent a label (0-25) as a one-to-one map for each alphabetic letter A-Z, and no cases for 9=J or 25=Z because of gesture motions. The training data includes a header row of: label, pixel1, pixel2 . . . pixel784 which represent a single 28×28 pixel image with grayscale pixel values between 0-255. Thus, each row in the dataset (not including the header) includes a label value that identifies an alphabetic letter and 784 pixel values where each column represents a single pixel of the 784 pixels of the image or a label (0-25) as a one-to-one map for each alphabetic letter A-Z.

In an embodiment, an input dataset can be reshaped or processed to expand the dimensionality of the dataset. For example, 2-dimensional x-y input training data may be reshaped or expanded to include a third dimension such as color depth. The use of three dimensions that includes a color depth value improves training for digital graphical images as the color depth value represents color intensity, which in turn represents the brightness of a color. For a grayscale input, a single byte suffices to carry a range of gray values for the third dimension. To increase the speed of adding a dimension, double-precision floating-point values may be converted to single-precision.

In a particular machine learning model configuration, a machine learning model comprises a convolutional neural network. A convolutional neural network may be configured to comprise one or more network layers. In one example, a convolutional neural network may be configured to include the following layers: a convolutional layer, a pooling layer, a dropout layer, a flatten layer, and a dense layer. In some embodiments, the pooling layer comprises a max pooling layer.

In another example, a convolutional neural network may be configured to include the following layers: a first convolutional layer, a second convolutional layer, a pooling layer, a first dropout layer, a flatten layer, a first dense layer, a second dropout layer, and a second dense layer. Each layer may include values for output shape and parameters. The first convolutional layer may include an output shape of '(None, 26, 26, 32)' and/or a number of parameters set to 320. The second convolutional layer may include an output shape of '(None, 24, 24, 32)' and/or a number of parameters set to 9248. The pooling layer may include an output shape of '(None, 12, 12, 32)' and/or a number of parameters set to 0. The first dropout layer may include an output shape of '(None, 12, 12, 32)' and/or a number of parameters set to 0. The flatten layer may include an output shape of '(None, 4608)' and/or a number of parameters set to 0. The first dense layer may include an output shape of '(None, 128)' and/or a number of parameters set to 589952. The second dropout layer may include an output shape of '(None, 128)' and/or a number of parameters set to 0. The second dense layer may include an output shape of '(None, 26)' and/or a number of parameters set to 3354. The specific parameters established in this example have been found to yield superior output accuracy results for classifying sign language gestures. In particular, the order, arrangement and parameterization of the dropout and flatten layers is considered influential on the value of training and the resulting output accuracy. This configuration has been found to increase the output accuracy of the gesture recognition system by up to 95%.

4.0 Example Functional Overview

Figure 2A:
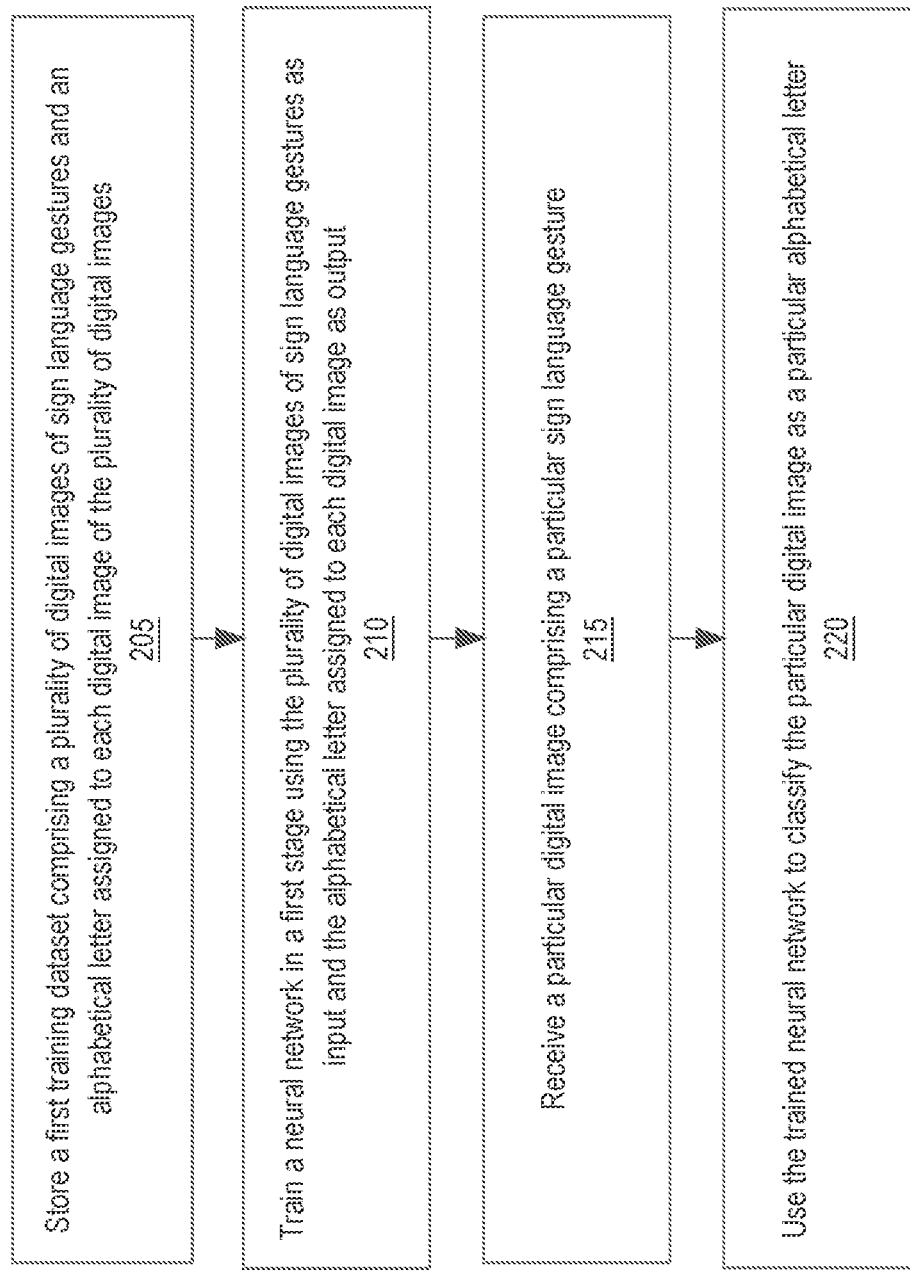
FIG. 2A illustrates an overview of an example programmable algorithm or method for machine recognition of gestures based on digital video images of human hand gestures, in one embodiment.

FIG. 2A illustrates an overview of an example programmable algorithm or method for machine recognition of gestures based on digital video images of human hand gestures. Although the steps in FIG. 2A are shown in an order, the steps of FIG. 2A may be performed in any order, and are not limited to the order shown in FIG. 2A. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 205, a first training dataset comprising a plurality of digital images of sign language gestures and an alphabetical letter assigned to each digital image of the plurality of digital images is stored. For example, a training dataset may be downloaded from an internet-based repository or created by a user and stored in a data repository. An example existing training dataset is the MNIST SIGN dataset from KAGGLE. The dataset may be extended or supplemented with separately prepared images of other persons signing the same gestures. The first training dataset comprises a large number of images with multiple instances of hand images for the same gesture or sign language letter, with variations in hand color, size, and arrangement of fingers that reflect how real users might gesture a particular letter.

In an embodiment, the first training dataset may be modified or reshaped to create a modified training dataset that includes a color depth dimension for the plurality of digital images. The model 108 may then be trained using the modified training dataset.

In an embodiment, a second training dataset is created for a second stage of training. The second training dataset comprises the first training set and digital images of sign language gestures that are classified as an alphabetical letter with confidence values above a threshold value after the first stage of training. The neural network is trained in a second stage using the second training dataset.

In step 210, a neural network is trained in a first stage using the plurality of digital images of sign language gestures as input and the alphabetical letter assigned to each digital image as output. For example, the machine learning back-end processor 104 may execute programmed instructions to train machine learning model 108. During training 110, digital images from the stored dataset 106 are processed to identify features that are influential on an output classification in terms of uniquely identifying a character that is represented in the gesture. The digital images of sign language gestures are used as input to the model 108 and the alphabetical letter assigned to each digital image is used as output to the model 108. Once the model 108 is trained via training phase 110, the model may be used in an activation phase 112 to classify input.

In an embodiment, the neural network may be configured using specific configuration parameters or settings to optimize classification accuracy of the gesture recognition system. Such specific configuration parameters are discussed in the section entitled "EXAMPLE MACHINE LEARNING MODEL CONFIGURATION".

In step 215, a particular digital image comprising a particular sign language gesture is received. For example, an image from camera 122, human user 120, or video conference system 140 is received by front-end program 102, which may call an API function of machine learning interface 103 to pass the image to machine learning back end processor 104.

In an embodiment, a graphical bounding box is caused to be displayed as an overlay on a real-time image or video capture. The graphical bounding box may include a prompt to form a hand gesture within the graphical bounding box. For example, the front-end program 102 may transmit a request to generate a graphical bounding box to video conference system 140 or camera 122. In response, video conference system 140 or camera 122 may generate the graphical bounding box, using color or other visual highlighting, as an overlay on an image of a human user, the image being captured from a camera as the user is participating in the video conference or image capture.

In step 220, the neural network trained in step 210 is used to classify the particular digital image as a particular alphabetical letter. For example, machine learning back end processor 104 may apply the image received in step 215 as input to the trained model 108 in activation phase 112. The activation phase 112 classifies the digital image based on extracting features and using classification logic to effectively compare the features to trained features of the model 108. Output may include an alphabetical letter or character value and a confidence value. For example, the letter value may be "A" and the confidence value could be "96%", or a real number between 0 and 1 such as 0.96, or an integer such as "96", indicating a level of confidence that the gesture was properly classified as "A".

In an embodiment, digital data identifying the particular alphabetical letter associated with the particular sign language gesture is caused to be displayed. For example, front-end program 102 may provide the communication of the digital data identifying the particular alphabetical letter to user 120, or other users, in any of a plurality of different means as described herein.

In an embodiment, digital data representing output speech that audibly speaks the particular sign language gesture is generated by a text-to-speech conversion function that converts strings of alphabetical letter characters into audible words. An audible transmission of the digital data representing output speech that audibly speaks the particular sign language gesture may then be displayed or presented to a user 120 via front-end program 102.

5.0 Example Functional Implementation

FIG. 2B illustrates an example programmable algorithm or method for machine recognition of gestures based on digital video images of human hand gestures. Although the steps in FIG. 2B are shown in an order, the steps of FIG. 2B may be performed in any order, and are not limited to the order shown in FIG. 2B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 240, a first training dataset comprising a plurality of digital images of sign language gestures and an alphabetical letter assigned to each digital image of the plurality of digital images is stored. For example, a training dataset may be downloaded from an internet-based repository or created by a user and stored in a data repository. An example existing training dataset is the MNIST SIGN dataset from KAGGLE. The first training dataset may be extended or supplemented with separately prepared images of other persons signing the same gestures. For example, the first training dataset may be modified or reshaped to create a modified training dataset that includes a color depth dimension for the plurality of digital images. The model 108 may then be trained using the modified training dataset. The first training dataset comprises a large number of images with multiple instances of hand images for the same gesture or sign language letter, with variations in hand color, size, and arrangement of fingers that reflect how real users might gesture a particular letter.

In step 245, a neural network is trained in a first stage using the plurality of digital images of sign language gestures as input and the alphabetical letter assigned to each digital image as output. For example, the machine learning back-end processor 104 may execute programmed instructions to train machine learning model 108. During training 110, digital images from the stored dataset 106 are processed to identify features that are influential on an output classification in terms of uniquely identifying a character that is represented in the gesture. The digital images of sign language gestures are used as input to the model 108 and the alphabetical letter assigned to each digital image is used as output to the model 108. Once the model 108 is trained via training phase 110, the model may be used in an activation phase 112 to classify input.

In step 250, the neural network is configured to include one or more network layers. The neural network may comprise a convolutional neural network. In one configuration, the one or more network layers may include a convolutional layer, a pooling layer, a dropout layer, a flatten layer, and a dense layer. In some embodiments, the pooling layer comprises a max pooling layer. In another configuration, the one or more network layers may include a first convolutional layer, a second convolutional layer, a pooling layer, a first dropout layer, a flatten layer, a first dense layer, a second dropout layer, and a second dense layer. Each layer may include values for output shape and parameters. For example, the first convolutional layer may include an output shape of '(None, 26, 26, 32)' and/or a number of parameters set to 320. The second convolutional layer may include an output shape of '(None, 24, 24, 32)' and/or a number of parameters set to 9248. The pooling layer may include an output shape of '(None, 12, 12, 32)' and/or a number of parameters set to 0. The first dropout layer may include an output shape of '(None, 12, 12, 32)' and/or a number of parameters set to 0. The flatten layer may include an output shape of '(None, 4608)' and/or a number of parameters set to 0. The first dense layer may include an output shape of '(None, 128)' and/or a number of parameters set to 589952. The second dropout layer may include an output shape of '(None, 128)' and/or a number of parameters set to 0. The second dense layer may include an output shape of '(None, 26)' and/or a number of parameters set to 3354. Additional possible configurations are discussed in the section entitled "EXAMPLE MACHINE LEARNING MODEL CONFIGURATION".

In step 255, a second training dataset is created for a second stage of training. The second training dataset comprises the first training set and digital images of sign language gestures that are each classified as an alphabetical letter with associated confidence values above a threshold value after the first stage of training. For example, digital images of sign language gestures from the first training dataset that are properly classified using the activation phase 112 and resulting in confidence values above a threshold value may be fed back to the first training dataset to create a second training dataset for use in a second stage of training. This approach has been found to increase the output accuracy of the gesture recognition system by up to 95%.

In step 260, the neural network is trained in a second stage using the second training dataset. For example, the machine learning back-end processor 104 may execute programmed instructions to train machine learning model 108. During training 110, digital images from the second training dataset created in step 255 are processed to identify features that are influential on an output classification in terms of uniquely identifying a character that is represented in the gesture. The digital images of sign language gestures are used as input to the model 108 and the alphabetical letter assigned to each digital image is used as output to the model 108. Once the model 108 is trained via training phase 110, the model may be used in an activation phase 112 to classify input.

In step 265, a graphical bounding box is caused to be displayed as an overlay on a real-time image or video capture associated with a client computing device. The graphical bounding box may include a prompt for a client or user to form a hand gesture within the graphical bounding box. For example, the front-end program 102 may transmit a request to generate a graphical bounding box to video conference system 140 or camera 122. In response, video conference system 140 or camera 122 may generate the graphical bounding box, using color or other visual highlighting, as an overlay on an image of a human user, the image being captured from a camera as the user is participating in the video conference or image capture.

In some embodiments, a video conference software application is programmed to generate a graphical bounding box, using color or other visual highlighting, as an overlay on an image of a human user, the image being captured from a camera as the user is participating in the video conference. That is, when a user participates in a video conference, rather than seeing only a thumbnail image of the user's face or upper body, the application is programmed to display an enlarged image with a bounding box. In an embodiment, digital image contents of the bounding box are periodically captured and programmatically transmitted to a back-end processing system for recognition.

In step 270, a particular digital image comprising a particular sign language gesture is received. The particular digital image may be captured based on the graphical bounding box from step 265. For example, an image from camera 122, human user 120, or video conference system 140 is received by front-end program 102, which may call an API function of machine learning interface 103 to pass the image to machine learning back end processor 104. In the c In step 275, the neural network trained in step 245 or 260 is used to classify the particular digital image as a particular alphabetical letter. For example, machine learning back end processor 104 may apply the image received in step 270 as input to the trained model 108 in activation phase 112. The activation phase 112 classifies the digital image based on extracting features and using classification logic to effectively compare the features to trained features of the model 108. Output may include an alphabetical letter or character value and a confidence value. For example, the letter value may be "A" and the confidence value could be "96%", or a real number between 0 and 1 such as 0.96, or an integer such as "96", indicating a level of confidence that the gesture was properly classified as "A".

In step 280, digital data identifying the particular alphabetical letter associated with the particular sign language gesture is caused to be displayed. For example, front-end program 102 may provide communication of the digital data identifying the particular alphabetical letter to user 120, or other users, in any of a plurality of different means as described herein.

In step 285, digital data representing output speech that audibly speaks the particular sign language gesture is generated by a text-to-speech conversion function that converts strings of alphabetical letter characters into audible words. For example, front-end program 102 may call functions of text-to-speech conversion library 130, based on strings of characters that have been formed into words, to generate output speech that audibly speaks the gesture. In an embodiment, text-to-speech conversion may be implemented using the GTTS Python package and Amazon Polly API.

In step 290, an audible transmission of the digital data representing output speech that audibly speaks the particular sign language gesture is caused to be presented to a user 120 of a client computing device via front-end program 102. The digital data representing output speech may be transmitted to a video conference system 140 for communication via a video switch or bridge to user 120 or to a plurality of other users 150 depending on the mode of operation. For example, if user 120 is hearing-impaired, then the system may operate in a mode in which images of the user's hand are captured and transformed into text and speech that is transmitted to other users 150.

Or, if user 120 is a hearing person, then the system could be used in a converse mode to receive text typed by the user, or speech spoken by the user, which is then transformed into images of gestures that are displayed to other users 150, who could be hearing-impaired. Speech spoken by a user may be processed using a speech recognition system to yield output text. That text, or text directly typed by a user in a computer application, may be processed character-by-character to select a particular digital image, from among a library of 24 sign images, and output visually to the hearing-impaired user. In some embodiments, this capability may be integrated into a video conference program or video conference bridge and executed in real-time as a speaker speaks in the conference.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
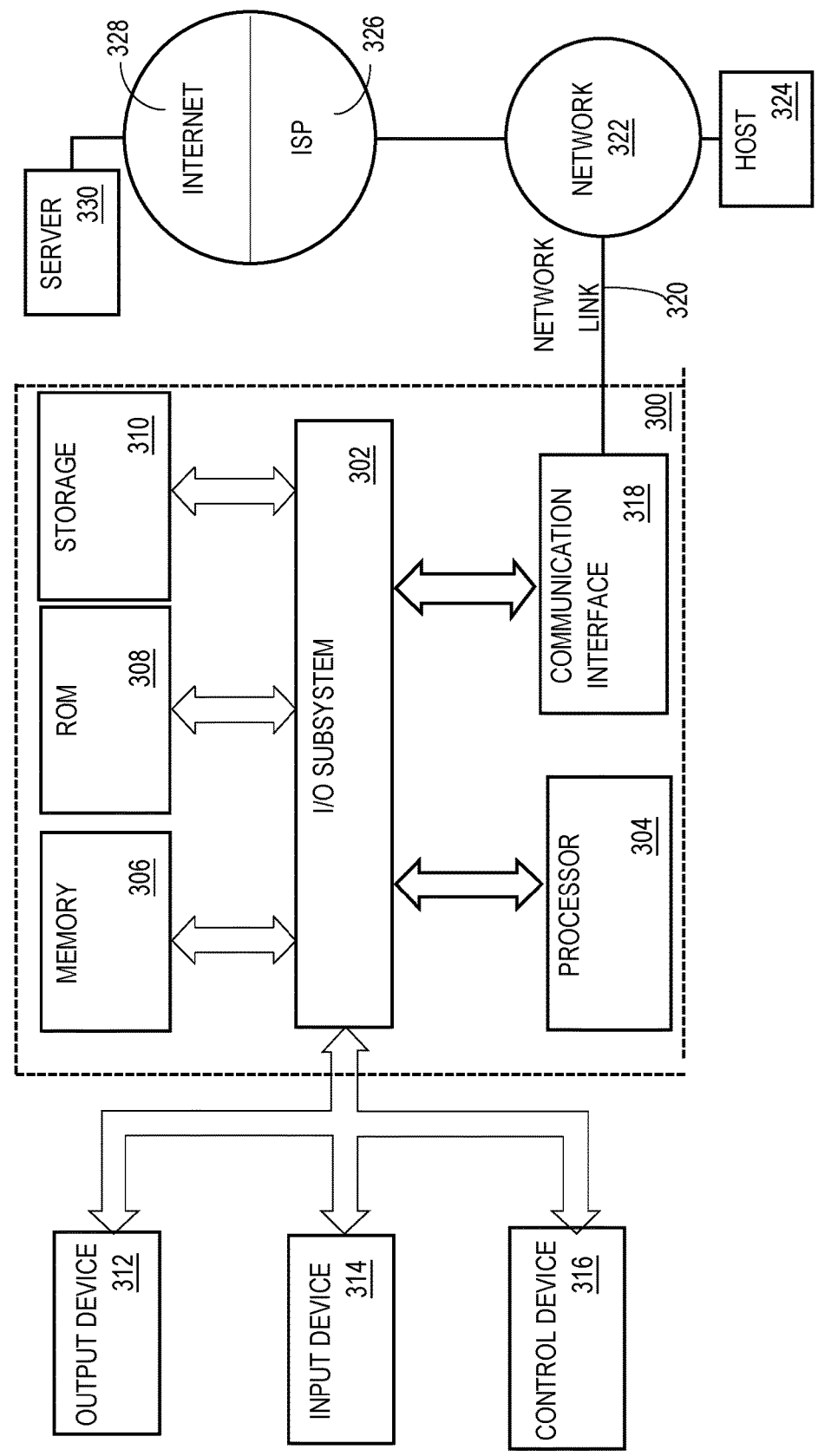
FIG. 3 is a block diagram that illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
storing a first training dataset comprising a plurality of digital images of sign language gestures and an alphabetical letter assigned to each digital image of the plurality of digital images;
training a neural network in a first stage using the plurality of digital images of sign language gestures as input and the alphabetical letter assigned to each digital image as output;
receiving a particular digital image comprising a particular sign language gesture;
using the trained neural network, classifying the particular digital image as a particular alphabetical letter;
causing displaying, on a client computing device, digital data identifying the particular alphabetical letter associated with the particular sign language gesture;
wherein the computer-implemented method is performed by one or more computing devices.

2. The computer-implemented method of claim 1, further comprising:
causing displaying, on a client computing device, a graphical bounding box as an overlay on a real-time image or video capture, the graphical bounding box including a prompt to form a hand gesture within the graphical bounding box.

3. The computer-implemented method of claim 1, further comprising:
generating, by a text-to-speech conversion function that converts strings of alphabetical letter characters into audible words, digital data representing output speech that audibly speaks the particular sign language gesture;
causing, on a client computing device, an audible transmission of the digital data representing output speech that audibly speaks the particular sign language gesture.

4. The computer-implemented method of claim 1, further comprising:
modifying the first training dataset to create a modified training dataset that includes a color depth dimension for the plurality of digital images;
training the neural network using the modified training dataset.

5. The computer-implemented method of claim 1, further comprising:
creating a second training dataset for a second stage of training comprising the first training set and digital images of sign language gestures that are classified as an alphabetical letter with confidence values above a threshold value after the first stage of training;
training the neural network in a second stage using the second training dataset.

6. The computer-implemented method of claim 1, further comprising:
configuring the neural network to include one or more network layers, the one or more network layers including at least: a convolutional layer, a pooling layer, a dropout layer, a flatten layer, and a dense layer.

7. The computer-implemented method of claim 6, wherein the dropout layer is configured to include an output shape of '(None, 12, 12, 32)' or '(None, 128)' and wherein the flatten layer is configured to include an output shape of '(None, 4608)'.

8. The computer-implemented method of claim 1, further comprising:
configuring the neural network to include one or more network layers, the one or more network layers including: a first convolutional layer, a second convolutional layer, a pooling layer, a first dropout layer, a flatten layer, a first dense layer, a second dropout layer, and a second dense layer.

9. The computer-implemented method of claim 8, wherein the first dropout layer is configured to include at least one of: an output shape of '(None, 12, 12, 32)' and a number of parameters set to 0, wherein the second dropout layer is configured to include at least one of: an output shape of '(None, 128)' and a number of parameters set to 0, and wherein the flatten layer is configured to include at least one of: an output shape of '(None, 4608)' and a number of parameters set to 0.

10. One or more non-transitory computer readable media storing one or more sequences of instructions which, when executed by one or more processors, cause:
storing a first training dataset comprising a plurality of digital images of sign language gestures and an alphabetical letter assigned to each digital image of the plurality of digital images;
training a neural network in a first stage using the plurality of digital images of sign language gestures as input and the alphabetical letter assigned to each digital image as output;
receiving a particular digital image comprising a particular sign language gesture;
using the trained neural network, classifying the particular digital image as a particular alphabetical letter;
causing displaying, on a client computing device, digital data identifying the particular alphabetical letter associated with the particular sign language gesture.

11. The one or more non-transitory computer readable media of claim 10, the sequences of instructions including instructions that, when executed by the one or more processors, cause:
causing displaying, on a client computing device, a graphical bounding box as an overlay on a real-time image or video capture, the graphical bounding box including a prompt to form a hand gesture within the graphical bounding box.

12. The one or more non-transitory computer readable media of claim 10, the sequences of instructions including instructions that, when executed by the one or more processors, cause:
generating, by a text-to-speech conversion function that converts strings of alphabetical letter characters into audible words, digital data representing output speech that audibly speaks the particular sign language gesture;
causing, on a client computing device, an audible transmission of the digital data representing output speech that audibly speaks the particular sign language gesture.

13. The one or more non-transitory computer readable media of claim 10, the sequences of instructions including instructions that, when executed by the one or more processors, cause:
modifying the first training dataset to create a modified training dataset that includes a color depth dimension for the plurality of digital images;

training the neural network using the modified training dataset.

14. The one or more non-transitory computer readable media of claim 10, the sequences of instructions including instructions that, when executed by the one or more processors, cause:
creating a second training dataset for a second stage of training comprising the first training set and digital images of sign language gestures that are classified as an alphabetical letter with confidence values above a threshold value after the first stage of training;
training the neural network in a second stage using the second training dataset.

15. The one or more non-transitory computer readable media of claim 10, the sequences of instructions including instructions that, when executed by the one or more processors, cause:
configuring the neural network to include one or more network layers, the one or more network layers including at least: a convolutional layer, a pooling layer, a dropout layer, a flatten layer, and a dense layer.

16. The one or more non-transitory computer readable media of claim 15, wherein the dropout layer is configured to include an output shape of '(None, 12, 12, 32)' or '(None, 128)' and wherein the flatten layer is configured to include an output shape of '(None, 4608)'.

17. The one or more non-transitory computer readable media of claim 10, the sequences of instructions including instructions that, when executed by the one or more processors, cause:
configuring the neural network to include one or more network layers, the one or more network layers including: a first convolutional layer, a second convolutional layer, a pooling layer, a first dropout layer, a flatten layer, a first dense layer, a second dropout layer, and a second dense layer.

18. The one or more non-transitory computer readable media of claim 17, wherein the first dropout layer is configured to include at least one of: an output shape of '(None, 12, 12, 32)' and a number of parameters set to 0, wherein the second dropout layer is configured to include at least one of: an output shape of '(None, 128)' and a number of parameters set to 0, and wherein the flatten layer is configured to include at least one of: an output shape of '(None, 4608)' and a number of parameters set to 0.

19. A computer system comprising:
one or more processors;
one or more memories storing instructions which, when executed by the one or more processors, cause the one or more processors to perform:
storing a first training dataset comprising a plurality of digital images of sign language gestures and an alphabetical letter assigned to each digital image of the plurality of digital images;
training a neural network in a first stage using the plurality of digital images of sign language gestures as input and the alphabetical letter assigned to each digital image as output;
receiving a particular digital image comprising a particular sign language gesture;
using the trained neural network, classifying the particular digital image as a particular alphabetical letter;
causing displaying, on a client computing device, digital data identifying the particular alphabetical letter associated with the particular sign language gesture.

20. The system of claim 19, further comprising:
configuring the neural network to include one or more network layers, the one or more network layers including at least: a convolutional layer, a pooling layer, a dropout layer, a flatten layer, and a dense layer;
wherein the dropout layer is configured to include an output shape of '(None, 12, 12, 32)' or '(None, 128)' and wherein the flatten layer is configured to include an output shape of '(None, 4608)'.

* * * * *